J. M. RUSBY.
MANUFACTURE OF CARBURETED WATER GAS.
APPLICATION FILED FEB. 27, 1911.

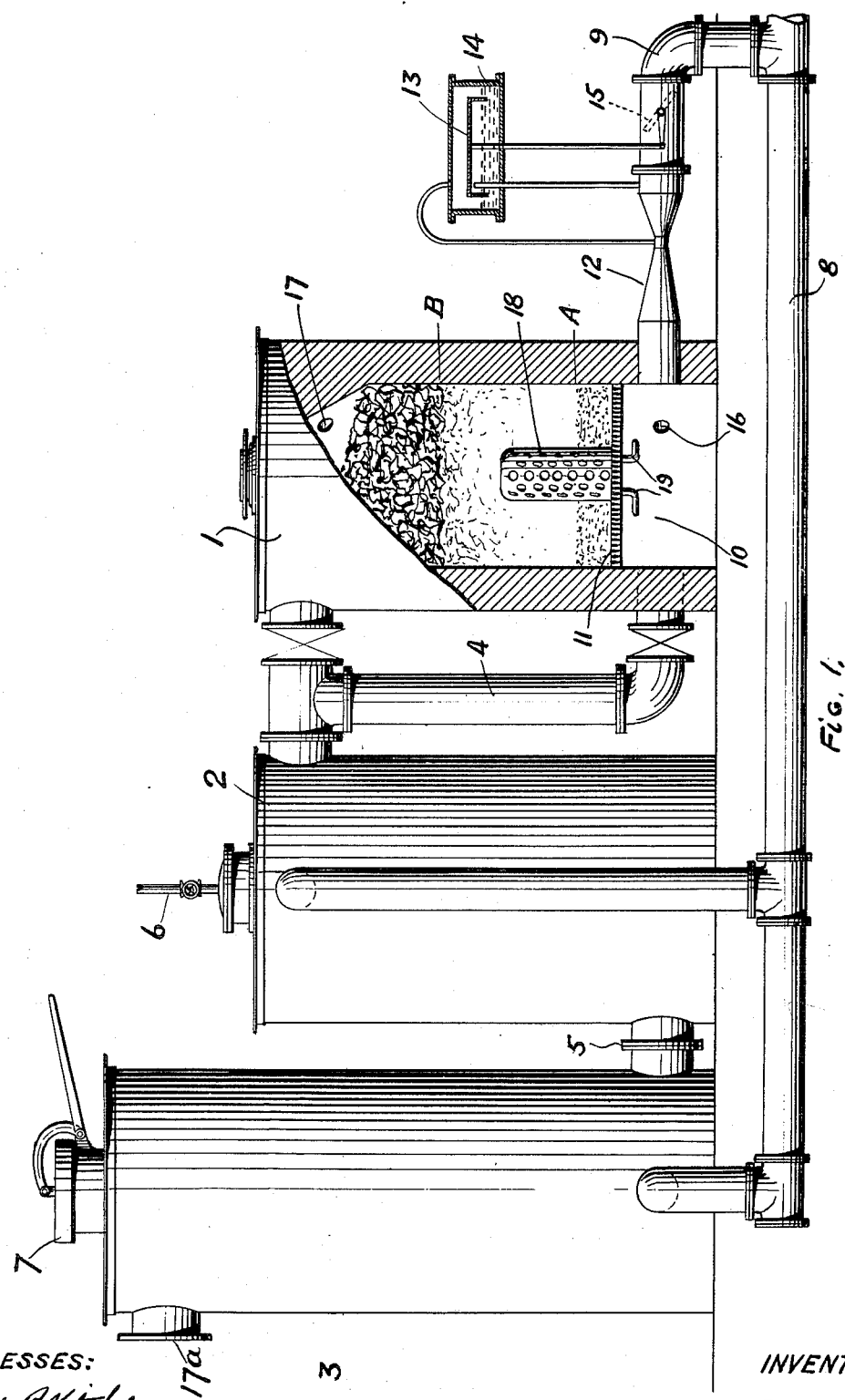

1,030,332.

Patented June 25, 1912.

2 SHEETS—SHEET 2.

WITNESSES:
Rob R Kitchel.
W H Fulweiler

INVENTOR
John M. Rusby
BY
Augustus B Stoughton
ATTORNEY.

UNITED STATES PATENT OFFICE.

JOHN M. RUSBY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

MANUFACTURE OF CARBURETED WATER-GAS.

1,030,332. Specification of Letters Patent. Patented June 25, 1912.

Application filed February 27, 1911. Serial No. 611,070.

*To all whom it may concern:*

Be it known that I, JOHN M. RUSBY, a citizen of the United States, and a resident of Philadelphia, in the county of Philadelphia and State of Pennsylvania, have invented certain new and useful Improvements in the Manufacture of Carbureted Water-Gas, of which the following is a specification.

In general, carbureted water gas is made by the repetition of steps known as the "blow" and "run" in suitable apparatus known as the "set" and that, generally stated, comprises a generator, fixing chambers which are preheated by internal combustion and called "carbureter" and "superheater," and necessary air, steam and oil supply connections. The "blow" consists in blasting a suitably ignited fuel bed with air to accelerate its combustion and heat the same to incandescence and generate fuel gas which is burned with an additional supply of air to generate heat that is stored by preheating a portion of the set. The "run" consists in passing steam through the incandescent fuel bed to make blue water gas, which is carbureted by the addition of suitable hydrocarbons and fixed as carbureted water gas, by the heat previously stored.

One object of the present invention is to improve the described operation of making carbureted water gas by increasing the capacity of the set per unit of time or in other words, by increasing the yield of carbureted water gas from a set of given size, or capacity when used for the manufacture of carbureted water gas by methods now and hitherto practiced or suggested.

Other objects are to effect an economy in the consumption of hydrocarbons used for carbureting and to render uniform the production of carbureted water gas on successive runs.

Other objects of the invention will appear from the following description in connection with which reference will be made to the accompanying drawings, in which—

Figure 4:
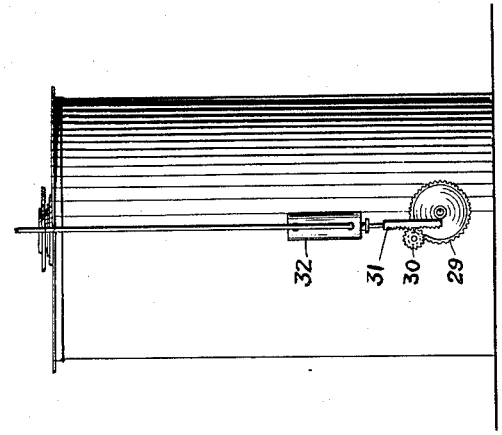
Figure 3:
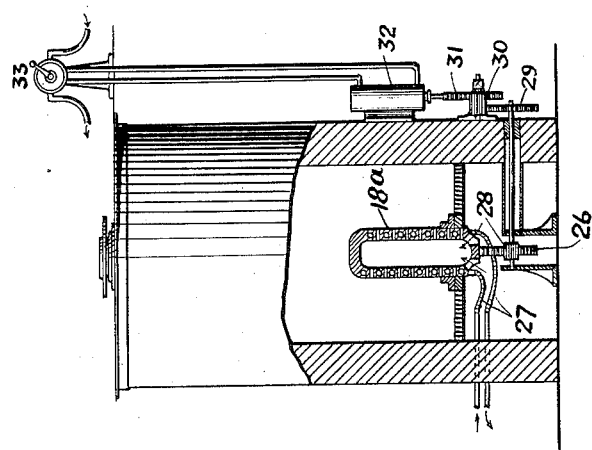
Figure 2:
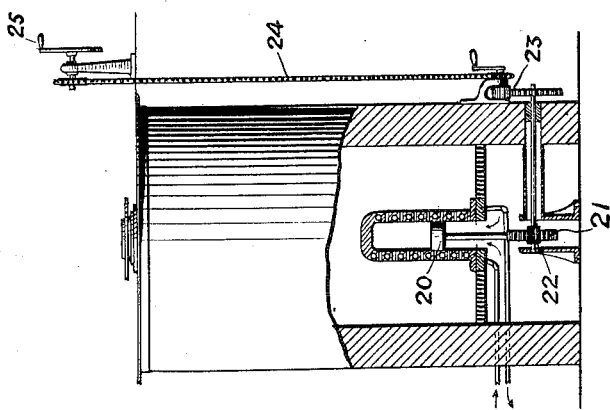

Figure 1 illustrates, partly in section and partly in elevation, a carbureted water gas set embodying features of the invention and adapted for the practice thereof. Fig. 2, represents, partly in elevation and partly in section, a modification showing one form of adjustment. Fig. 3, represents similarly a modification of another form of adjustment; and Fig. 4, is a side view of Fig. 3.

In the drawings 1 is the generator, 2 the carbureter and 3 the superheater, and these intercommunicate; the generator and the carbureter by way of connections 4, which may bring either the top or the bottom of the generator into communication with the top of the carbureter; and the bottom of the carbureter communicates with the bottom of the superheater by connections 5.

6, is a supply connection for oil or hydrocarbon to the interior of the carbureter.

7, is a stack valve for the superheater.

8, are connections for supplying air to the top of the carbureter and the bottom of the superheater.

The branch air pipe 9, leads to the chamber 10, beneath the grate 11 of the generator and is provided with an automatic air regulator, the purpose of which is to automatically keep the volume of air blast constant. As shown there is a Venturi tube 12, the mouth and throat of which are connected above and below the movable member 13, arranged in a seal box 14 and connected with the damper 15.

16, and 17, are steam inlets arranged the one near the top of the generator and the other in the chamber 10 beneath the grate 11 thereof.

18, is a perforated dome open at its bottom and projecting into the interior of the generator so as to discharge toward the walls thereof. One such dome resting on the grate, Figs. 1 and 2, or extending through the grate, Fig. 2, is shown, but the number may be increased. Connections 19 are shown by means of which the dome may be water cooled.

In the practice of the process of the invention by means of the described apparatus, an ignited bed of fuel is established in the generator and the dome 18 extends into the interior portion of this bed of fuel so that it extends above the ash line or level A and terminates beneath a superposed layer B of comparatively cool fuel, which will be hereinafter referred to. During the "blow" the stack valve is open, the oil and steam supply cut off as usual and the air blast is delivered to the chamber 10 and in part rises through the grate and in part rises through the dome. If, by reason of the formation of clinker on the surface of the grate or in any other way, the part rising through the grate is diminished, the part rising through the dome is correspondingly increased. Where the quantity of the blast is automatically, or otherwise, kept constant this quantity of air is passed through the fire at all times either by way of the grate or by way of the dome, or both, without undue increase in blast pressure.

Inasmuch as the blasting with air takes place in the interior portion of the fuel bed, the region of gas making activity is increased and the rate of production of fuel gas is also increased, or in other words, the capacity of the generator is increased and the hitherto relatively inactive interior portions of the fuel bed are made active. Hitherto the region of gas making activity in carbureted water gas sets has been largely confined to the grate area, but has not always been co-extensive with that area because the fuel is less compact near the walls of the generator than it is at the center, so that there is a tendency for the blast to rise near the walls rather than to go through the center. The supply of fuel at B is relatively cool in respect to the fuel below it and in this superposed supply or layer of fuel sensible heat from the gas passing through it is stored, but combustion of fuel gas from carbon monoxid to carbon dioxid does not take place. The fuel gas so generated which is of relatively large volume is burned in the carbureter and superheater along with an appropriate supply of air called "secondary air", so as to preheat those chambers; and the waste products of combustion escape at 7. During the "run" the air supplies are cut off, steam is introduced either by 16 or 17, as desired, the off-take 17ª, for carbureted water gas is opened, the stack valve 7 is closed, and oil or hydrocarbon is introduced through 6. The steam is introduced to the extended region of gas making activity at the interior portion of the fuel bed, so that blue water gas is generated in increased quantity. This increased quantity of blue water gas is carbureted and fixed in its passage through the carbureter and superheater, thus the capacity of the carbureted water gas set per unit of time is increased. The character of fuel employed may vary in respect to fineness and other qualities so that while before or after introducing the air blast, or steam, into the interior of the fuel bed as has been described it may be necessary or desirable to change the point of application of the air blast or steam, or the air may be introduced at one level and the steam at another level; for this purpose I have shown examples of various means.

In Fig. 2, 20 is a piston by means of which the effective height of the dome can be increased or diminished. The rod of the piston is shown as provided with a rack 21 with which engages a pinion 22 applied to one end of a shaft, the other end of which is fitted with suitable gearing 23 by which it can be turned. The gearing 23 is shown as driven by a chain 24 operated by a handle 25.

In Fig. 3, the dome 18ª is shown as movable vertically through a collar on the grate and it is provided with a rack 26 and with flexible water cooling connections 27.

28, is a pinion for driving the rack and it is attached to a shaft which extends through the shell and is provided with a toothed wheel 29, which meshes with a pinion 30, the latter is operated by a rack 31 which is shifted by an hydraulic motor 32, the connections of which extend upward and are controlled by a valve 33.

By reason of the described method of blasting in the interior of the fuel bed, the following results are attained: First—an increased quantity of heat is stored in the fuel bed which increased quantity of heat is available for making increased quantity of water gas when the steam is applied, and second—an increased quantity of fuel gas is provided for combustion with secondary air for appropriately heating a fixing chamber in which the increased quantity of water gas is carbureted and fixed. Thus an increased quantity of carbureted water gas is produced.

What I claim is:

1. The improvement in the process of making carbureted water gas which consists in extending the region of gas making activity of a burning fuel bed and increasing the rate of storage of heat in the fuel bed and the rate of production of fuel gas by blasting air in the interior portions of the fuel bed, leading the fuel gas so produced in contact with and through the fuel bed to the end thereof to store heat in the comparatively cool fuel, leading off and burning the partially cooled fuel gas with air to internally heat a separate chamber, then introducing steam to the extended region of gas making activity at the interior portion of the fuel bed and producing blue water gas in increased quantity, leading the blue water gas to the previously heated chamber and carbureting it by the addition of suitable hydrocarbons and fixing the carbureted water gas by passing it through the previously heated chamber.

2. The improvement in the process of making carbureted water gas which consists in extending the region of gas making activity of a burning fuel bed and increasing the rate of storage of heat in the fuel bed and the rate of production of fuel gas by blasting air in the interior portions of the fuel bed, maintaining the quantity of air constant, leading the fuel gas so produced in contact with and through the fuel bed to the end thereof to store heat in the comparatively cool fuel, leading off and burning the partially cooled fuel gas with air to internally heat a separate chamber, then introducing steam to the extended region of gas making activity at the interior portion of the fuel bed and producing blue water gas in increased quantity, and carbureting the blue water gas by the addition of suitable hydrocarbons and fixing it by passing it through the previously heated chamber.

3. The improvement in the process of making carbureted water gas which consists in extending the region of gas making activity of a burning fuel bed and increasing the rate of storage of heat in the fuel bed and the rate of production of fuel gas by blasting air in the interior portions of the fuel bed, adjusting the point of application of the air blast in the interior of the fuel bed with regard to the quality or condition of the fuel bed, leading the fuel gas so produced in contact with and through the fuel bed to the end thereof to store heat in the comparatively cool fuel, leading off and burning the partially cooled fuel gas with air to internally heat a suitable chamber, then introducing steam to the extended region of gas making activity at the interior portion of the fuel bed and producing blue water gas in increased quantity, carbureting the blue water gas by the addition of a suitable hydro-carbon, and fixing the carbureted water gas by passing it through the previously heated chamber.

4. The improvement in the process of making carbureted water gas which consists in extending the region of gas making activity of a burning fuel bed and increasing the rate of storage of heat in the fuel bed and the rate of production of fuel gas by blasting air into the interior portions of the fuel bed, leading the fuel gas so produced in contact with and through the fuel bed to the end thereof to store heat in the comparatively cool fuel, leading off and burning the partially cooled fuel gas with air to internally heat a suitable chamber, then introducing steam to the extended region of gas making activity at the interior portions of the fuel bed and producing blue water gas in increased quantity, adjusting the point of application of the steam in the interior of the fuel bed with regard to the quality or condition of the fuel bed, carbureting the blue water gas by the addition of a suitable hydrocarbon, and fixing the carbureted water gas by passing it through the previously heated chamber.

5. The improvement in the process of making carbureted water gas which consists in extending the region of gas making activity of a burning fuel bed and increasing the rate of production of fuel gas by blasting air in the interior portions of the fuel bed above the ash level, leading the fuel gas so produced in contact with and through the fuel bed to the end thereof to store heat in the comparatively cool fuel, leading off and burning the partially cooled fuel gas with air to internally heat a suitable chamber, then introducing steam to the extended region of gas making activity at the interior portion of the fuel bed and producing blue water gas in increased quantity, carbureting the blue water gas by the addition of a suitable hydrocarbon, and fixing the carbureted water gas by passing it through the previously heated chamber.

6. The improvement in the process of making carbureted water gas which consists in extending the region of gas making activity of a burning fuel bed and increasing the rate of production of fuel gas by blasting air in the interior portions of the fuel bed above the ash level and below the top layer of comparatively cool fuel, leading the fuel gas so produced in contact with and through the fuel bed to the end thereof to store heat in the comparatively cool fuel, leading off and burning the partially cooled fuel gas with air to internally heat a suitable chamber, then introducing steam to the extended region of gas making activity at the interior portion of the fuel bed and producing blue water gas in increased quantity, carbureting the blue water gas by the addition of a suitable hydrocarbon, and fixing the carbureted water gas by passing it through the previously heated chamber.

In testimony whereof I have hereunto signed my name.

JOHN M. RUSBY.

Witnesses:
W. H. FULWEILER,
CLIFFORD K. CASSEL.